(12) United States Patent
Romano et al.

(10) Patent No.: US 11,440,648 B2
(45) Date of Patent: Sep. 13, 2022

(54) COMPACT VIBRATION ISOLATION SYSTEMS FOR AIRCRAFT

(71) Applicant: Textron Innovations Inc., Providence, RI (US)

(72) Inventors: Peter Quinn Romano, Fort Worth, TX (US); Frank Bradley Stamps, Colleyville, TX (US); Michael Scott Seifert, Southlake, TX (US)

(73) Assignee: Textron Innovations Inc., Providence, RI (US)

( * ) Notice: Subject to any disclaimer, the term of this patent is extended or adjusted under 35 U.S.C. 154(b) by 327 days.

(21) Appl. No.: 16/855,706

(22) Filed: Apr. 22, 2020

(65) Prior Publication Data

US 2021/0331787 A1 Oct. 28, 2021

(51) Int. Cl.
*B64C 27/00* (2006.01)
*F16F 7/10* (2006.01)
*F16F 13/10* (2006.01)

(52) U.S. Cl.
CPC .......... *B64C 27/001* (2013.01); *F16F 7/1034* (2013.01); *F16F 13/10* (2013.01); *B64C 2027/002* (2013.01); *F16F 2222/08* (2013.01)

(58) Field of Classification Search
CPC .......... F16F 7/10; F16F 7/1017; F16F 7/1034; B64C 27/001; B64C 2027/002
USPC ................. 267/136, 140.11, 140.13; 244/54
See application file for complete search history.

(56) References Cited

U.S. PATENT DOCUMENTS

| | | | |
|---|---|---|---|
| 4,236,607 A | | 12/1980 | Halwes et al. |
| 4,811,919 A | * | 3/1989 | Jones ....................... F16F 13/08 244/54 |
| 5,374,039 A | * | 12/1994 | Schmidt .................. B64C 27/35 267/140.13 |
| 5,435,531 A | | 7/1995 | Smith et al. |
| 5,439,082 A | | 8/1995 | McKeown et al. |
| 5,732,905 A | * | 3/1998 | Krysinski ............. F16F 15/027 244/54 |
| 5,762,295 A | * | 6/1998 | McGuire ................. F16F 13/18 244/54 |
| 5,788,372 A | * | 8/1998 | Jones ..................... F16F 9/5126 267/293 |
| 8,499,907 B2 | | 8/2013 | Smith et al. |
| 9,145,946 B2 | | 9/2015 | David et al. |
| 9,249,856 B1 | | 2/2016 | Lee et al. |
| 2005/0285318 A1 | * | 12/2005 | Winkler ................ F16F 13/103 267/140.13 |

(Continued)

*Primary Examiner* — Thomas J Williams
(74) *Attorney, Agent, or Firm* — Lawrence Youst PLLC (57) ABSTRACT

A liquid inertia vibration eliminator unit for an aircraft having first and second components includes an outer housing coupled to the first component of the aircraft, the outer housing forming an outer housing cavity. The liquid inertia vibration eliminator unit includes a spherical bearing disposed in the outer housing cavity and forming a spherical bearing cavity. A piston is disposed in the spherical bearing cavity and coupled to the second component of the aircraft. Top and bottom fluid chambers are disposed in the spherical bearing cavity on opposite sides of the piston. A tuning passage provides fluid communication between the top and bottom fluid chambers. A tuning fluid moves between the top and bottom fluid chambers via the tuning passage to isolate vibration between the first and second components of the aircraft.

19 Claims, 9 Drawing Sheets

(56) References Cited

U.S. PATENT DOCUMENTS

2013/0119591 A1    5/2013   Lee et al.
2018/0265186 A1    9/2018   Foskey et al.

* cited by examiner

COMPACT VIBRATION ISOLATION SYSTEMS FOR AIRCRAFT

TECHNICAL FIELD OF THE DISCLOSURE

The present disclosure relates, in general, to vibration isolation systems for use on aircraft and, in particular, to compact liquid inertia vibration eliminator units configured to reduce the transmission of vibration between components of an aircraft, the compact liquid inertia vibration eliminator units utilizing a size-reducing bearing configuration.

BACKGROUND

The rotor systems of helicopters and other rotorcraft are susceptible to oscillatory vibrations at particular frequencies. Non-limiting examples of rotorcraft vibrations of concern include a blade pass frequency and higher harmonics, among others. These vibrations may be transmitted to other parts of the aircraft. One particularly problematic vibration transmission for a helicopter is a vibration transmission from the main rotor system to the fuselage. The transmission of rotor system vibrations throughout the helicopter can cause damage to the helicopter's various systems and/or cause occupant discomfort due to excessive vibration of the fuselage.

Aircraft employ vibration isolation systems to intercept these dangerous vibrations and reduce their effect on other parts of the aircraft. Some vibration isolation systems utilize a liquid inertia vibration eliminator unit, which accelerates the mass of a tuning fluid out of phase with the vibration of the rotor system, thereby isolating the rotor system vibration from other parts of the aircraft. One drawback of existing liquid inertia vibration eliminator units is that they employ internal tuning passages through a piston and a bearing configuration that necessitates an increase in the overall size and weight of the vibration isolation system. The larger size and weight of existing liquid inertia vibration eliminator units limit the configuration, placement and number of liquid inertia vibration eliminator units employed on a given aircraft in view of the spatial and weight constraints typically present in aerospace applications. Accordingly, a need has arisen for a liquid inertia vibration eliminator unit utilizing a tuning passage, bearing configuration and/or other features that enable a reduction in the spatial dimensions of the liquid inertia vibration eliminator unit.

SUMMARY

In a first aspect, the present disclosure is directed to a liquid inertia vibration eliminator unit for an aircraft having first and second components including an outer housing coupled to the first component of the aircraft, the outer housing forming an outer housing cavity. The liquid inertia vibration eliminator unit includes a spherical bearing disposed in the outer housing cavity and forming a spherical bearing cavity. A piston is disposed in the spherical bearing cavity and coupled to the second component of the aircraft. Top and bottom fluid chambers are disposed in the spherical bearing cavity on opposite sides of the piston. A tuning passage provides fluid communication between the top and bottom fluid chambers. A tuning fluid moves between the top and bottom fluid chambers via the tuning passage to isolate vibration between the first and second components of the aircraft.

In some embodiments, the first component may include an airframe and the second component may include a pylon assembly including a transmission. In certain embodiments, the outer housing may form an inner surface defining the outer housing cavity and the spherical bearing may substantially cover the inner surface of the outer housing. In such embodiments, the inner surface of the outer housing may be a concave inner surface. In some embodiments, the spherical bearing may be formed from an elastomeric material. In certain embodiments, the spherical bearing may form a concave inner surface defining the spherical bearing cavity. In some embodiments, the piston may oscillate inside the spherical bearing cavity in response to the vibration of one of the first or second components of the aircraft. In such embodiments, the tuning fluid may oscillate between the top and bottom fluid chambers via the tuning passage in response to the oscillations of the piston. In some embodiments, the piston may be solid and/or form an ellipsoid shape.

In some embodiments, the liquid inertia vibration eliminator unit may include a top piston rod coupled to the top side of the piston, the piston coupled to the second component of the aircraft via the top piston rod. In certain embodiments, the top side of the piston may at least partially define the top fluid chamber and the bottom side of the piston may at least partially define the bottom fluid chamber. In some embodiments, the top and bottom fluid chambers may be annular in shape. In certain embodiments, the tuning passage may include an external tuning tube disposed outside of the outer housing. In certain embodiments, the liquid inertia vibration eliminator unit may include a fluid chamber housing disposed in the spherical bearing cavity such that the spherical bearing may be interposed between the fluid chamber housing and the outer housing. In such embodiments, the fluid chamber housing may form an outer side surface shaped to contour an inner surface of the outer housing cavity and the spherical bearing may substantially cover the outer side surface of the fluid chamber housing. In some embodiments, the fluid chamber housing may form a fluid chamber housing cavity having a concave inner surface at least partially defining the top and bottom fluid chambers. In certain embodiments, the spherical bearing may permit rotational and pivotal movement of the fluid chamber housing relative to the outer housing.

In some embodiments, the liquid inertia vibration eliminator unit may include a middle journal bearing interposed between a middle portion of the piston and the fluid chamber housing. In such embodiments, the top side of the middle journal bearing may at least partially define the top fluid chamber and the bottom side of the middle journal bearing may at least partially define the bottom fluid chamber. In certain embodiments, the middle journal bearing may be formed from an elastomeric material. In some embodiments, the liquid inertia vibration eliminator unit may include a top journal bearing coupled to the top side of the piston, a bottom journal bearing coupled to the bottom side of the piston and a middle journal bearing coupled to the middle portion of the piston between the top and bottom sides of the piston. The journal bearings may be annular and formed from an elastomeric material. In certain embodiments, the liquid inertia vibration eliminator unit may include a gas accumulator in fluid communication with the fluid chambers via a gas passage to pressurize the tuning fluid. In some embodiments, the liquid inertia vibration eliminator unit may include a fluid chamber housing disposed in the spherical bearing cavity and the gas accumulator may be disposed on the top side of the fluid chamber housing. In certain embodiments, the liquid inertia vibration eliminator unit may include a top piston rod coupled to the top side of the piston and the gas accumulator may be disposed in the top piston rod.

In a second aspect, the present disclosure is directed to a rotorcraft including a fuselage, a fuselage airframe supporting the fuselage, a pylon assembly subject to vibration and a plurality of liquid inertia vibration eliminator units interposed between the fuselage airframe and the pylon assembly. Each liquid inertia vibration eliminator unit includes an outer housing coupled to the fuselage airframe, the outer housing forming an outer housing cavity. A spherical bearing is disposed in the outer housing cavity and forms a spherical bearing cavity. A piston is disposed in the spherical bearing cavity and coupled to the pylon assembly. Top and bottom fluid chambers are disposed in the spherical bearing cavity on opposite sides of the piston. A tuning passage provides fluid communication between the top and bottom fluid chambers. A tuning fluid moves between the top and bottom fluid chambers via the tuning passage to isolate vibration between the pylon assembly and the fuselage airframe.

In some embodiments, the pistons of the liquid inertia vibration eliminator units may be coupled to an underside of the pylon assembly and the outer housings of the liquid inertia vibration eliminator units may be coupled to a top side of the fuselage airframe. In certain embodiments, each liquid inertia vibration eliminator unit may have a height H and a width W, where W is greater than H. In other embodiments, W may be equal to or greater than 2H. In certain embodiments, the rotorcraft may include a mounting plate forming a clearance aperture coupled to an underside of the outer housing, the outer housing coupled to the fuselage airframe via the mounting plate.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
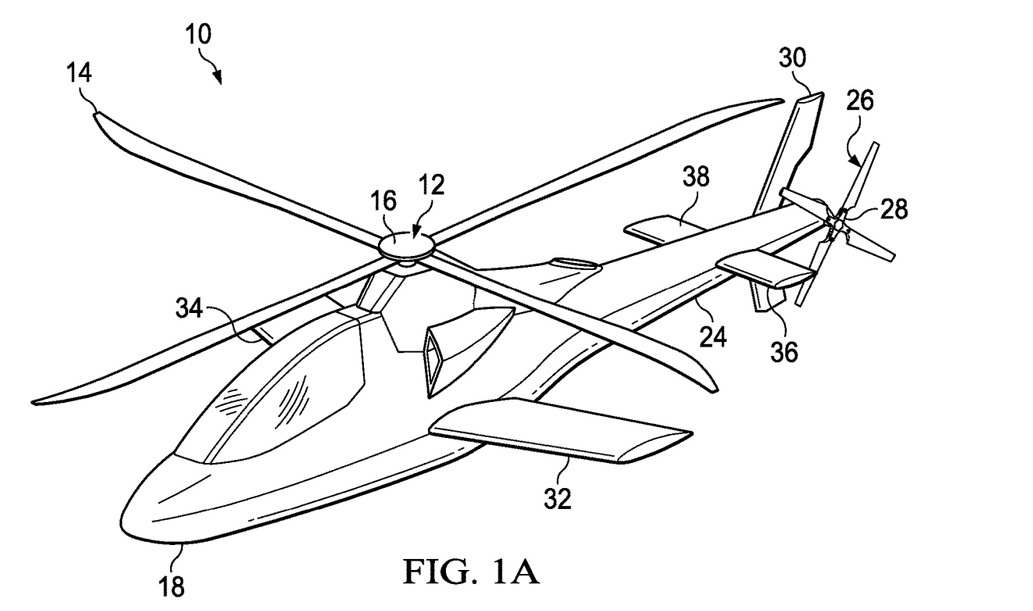
FIGS. 1A-1C are schematic illustrations of a helicopter including a compact vibration isolation system in accordance with embodiments of the present disclosure.
Figure 1B:
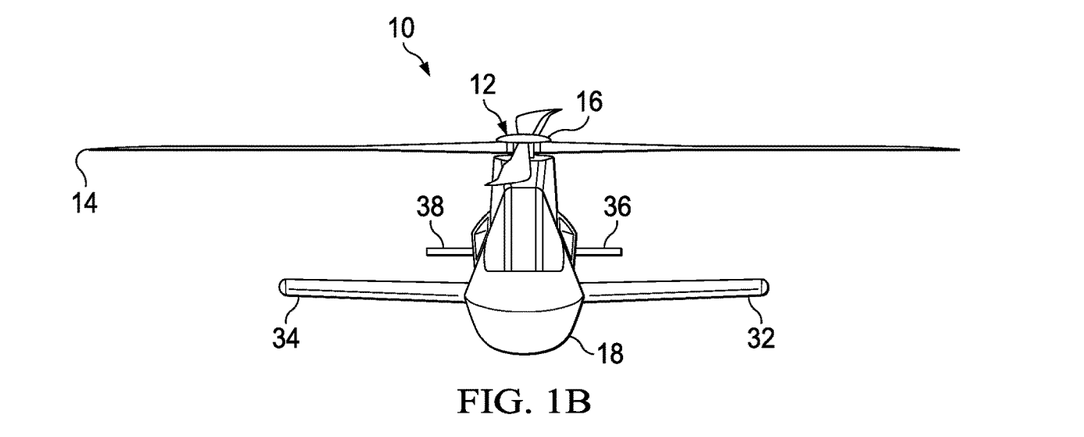
Figure 1C:
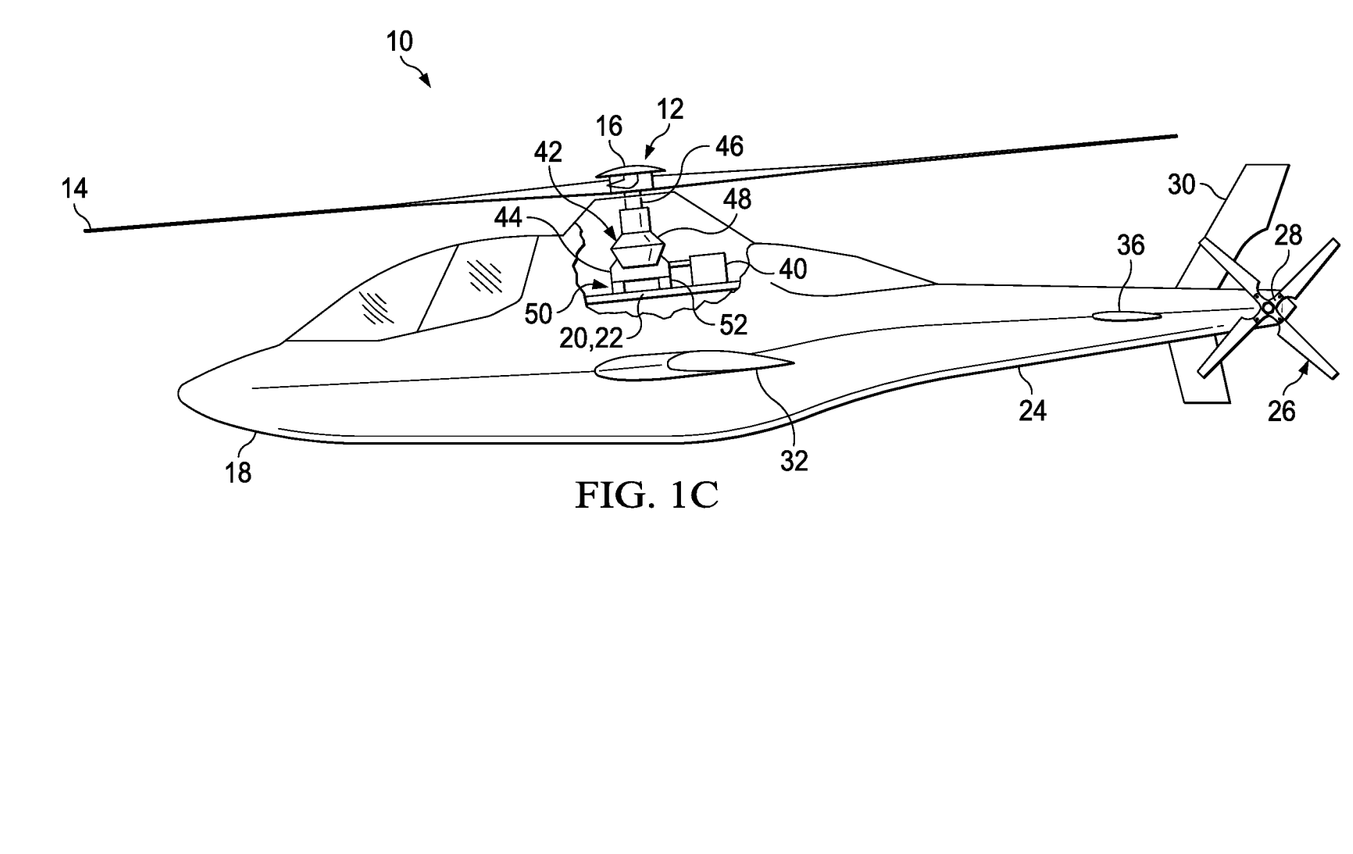

Referring to FIGS. 1A-1C in the drawings, a rotorcraft in the form of a helicopter is schematically illustrated and generally designated 10. The primary propulsion for helicopter 10 is a main rotor system 12. Main rotor system 12 includes a plurality of rotor blades 14 extending radially outward from a main rotor hub 16. Main rotor system 12 is coupled to a fuselage 18 and is rotatable relative thereto. Fuselage 18 is supported by a fuselage airframe 20 including fore-aft beams 22. The pitch of rotor blades 14 can be collectively and/or cyclically manipulated to selectively control direction, thrust and lift of helicopter 10. A collective control may be used to control the altitude and/or speed of helicopter 10 by simultaneously changing the pitch angle of all rotor blades 14 independently of their position. For example, during a stable hover, if pilot input is made to the collective control, the pitch angle of all rotor blades 14 changes simultaneously and equally, resulting in helicopter 10 either increasing or decreasing in altitude. A cyclic control may be used to control the attitude and/or direction of helicopter 10 by controlling the pitch of rotor blades 14 cyclically, that is, the pitch of each rotor blade 14 will vary during each rotation. The variation in pitch has the effect of varying the angle of attack of, and thus the lift generated by, each rotor blade 14 as it rotates. Thus, if the cyclic control is moved forward or backward, main rotor system 12 generates thrust in the forward direction or backward direction, respectively. Similarly, if the cyclic control is moved to the right or to the left, main rotor system 12 generates thrust in the right direction or left direction, respectively.

A tailboom 24 extends from fuselage 18 in the aft direction. An anti-torque system 26 includes a tail rotor assembly 28 coupled to an aft end of tailboom 24. Anti-torque system 26 controls the yaw of helicopter 10 by counteracting the torque exerted on fuselage 18 by main rotor system 12. In the illustrated embodiment, helicopter 10 includes a vertical tail fin 30 that provides stabilization to helicopter 10 during high speed forward flight. In addition, helicopter 10 includes wings 32, 34 that extend laterally from fuselage 18 and wings 36, 38 that extend laterally from tailboom 24. Wings 32, 34, 36, 38 provide lift to helicopter 10 responsive to the forward airspeed of helicopter 10, thereby reducing the lift requirement on main rotor system 12 and increasing the top speed of helicopter 10. Main rotor system 12 receives torque and rotational energy from a main engine or motor 40. Main engine 40 is coupled to a main rotor pylon assembly 42 by suitable gearing, clutching and/or shafting. Main rotor pylon assembly 42 includes a transmission 44 which is coupled to main rotor system 12 by a mast 46 at least partially encased by a top case 48.

During operation of helicopter 10, main rotor pylon assembly 42 may experience vibrations at, for example, a blade pass frequency and/or higher harmonics, among others. These vibrations of main rotor pylon assembly 42 can spread to other components of helicopter 10, which may lead to component wear or damage. Vibrations from main rotor pylon assembly 42 may also shake fuselage 18 excessively, causing discomfort to the occupants in fuselage 18. To reduce or prevent the spread of vibration from main rotor pylon assembly 42 to other parts of helicopter 10, helicopter 10 includes a compact vibration isolation system 50. Compact vibration isolation system 50 includes compact liquid inertia vibration eliminator units 52 interposed between main rotor pylon assembly 42 and fore-aft beams 22 of fuselage airframe 20 to intercept the vibration of main rotor pylon assembly 42 before it reaches fuselage 18. Compact liquid inertia vibration eliminator units 52 are vibration-canceling throughput units that attenuate, isolate or otherwise reduce transfer of mechanical or harmonic vibration such as periodic vibration between different aircraft components such as main rotor pylon assembly 42 and fuselage airframe 20. Compact liquid inertia vibration eliminator units 52 reduce or prevent the transmission of pitching, rolling and other vibrations from main rotor pylon assembly 42 to fuselage airframe 20, fuselage 18 and other parts of helicopter 10. Reducing such vibration improves avionics, passenger comfort and electronic and structural component longevity.

It should be appreciated that helicopter 10 is merely illustrative of a variety of aircraft that can implement the embodiments disclosed herein. Indeed, compact vibration isolation system 50 may be implemented on any aircraft. Other aircraft implementations can include hybrid aircraft, tiltwing aircraft, tiltrotor aircraft, quad tiltrotor aircraft, unmanned aircraft, gyrocopters, propeller-driven airplanes, compound helicopters, jets, drones and the like. As such, those skilled in the art will recognize that compact vibration isolation system 50 can be integrated into a variety of aircraft configurations. It should be appreciated that even though aircraft are particularly well-suited to implement the embodiments of the present disclosure, non-aircraft vehicles and devices can also implement the embodiments.

Figure 2A:
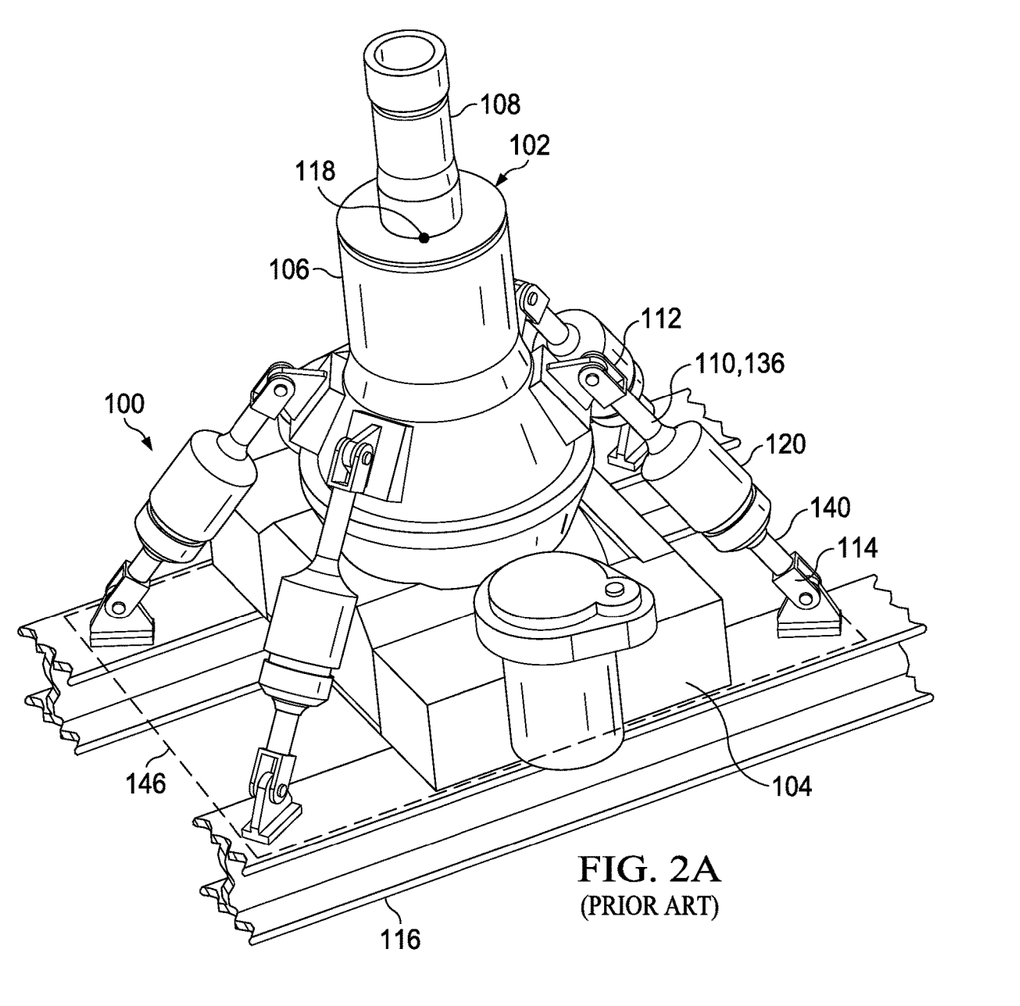
FIGS. 2A-2C are various views of a vibration isolation system utilized on previous aircraft.
Figure 2B:
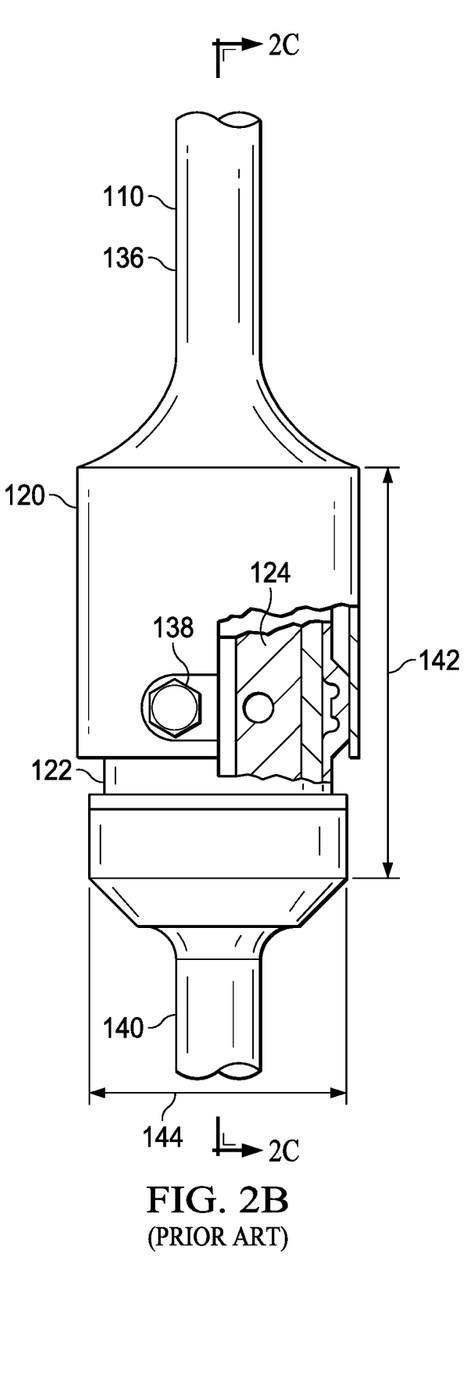
Figure 2C:
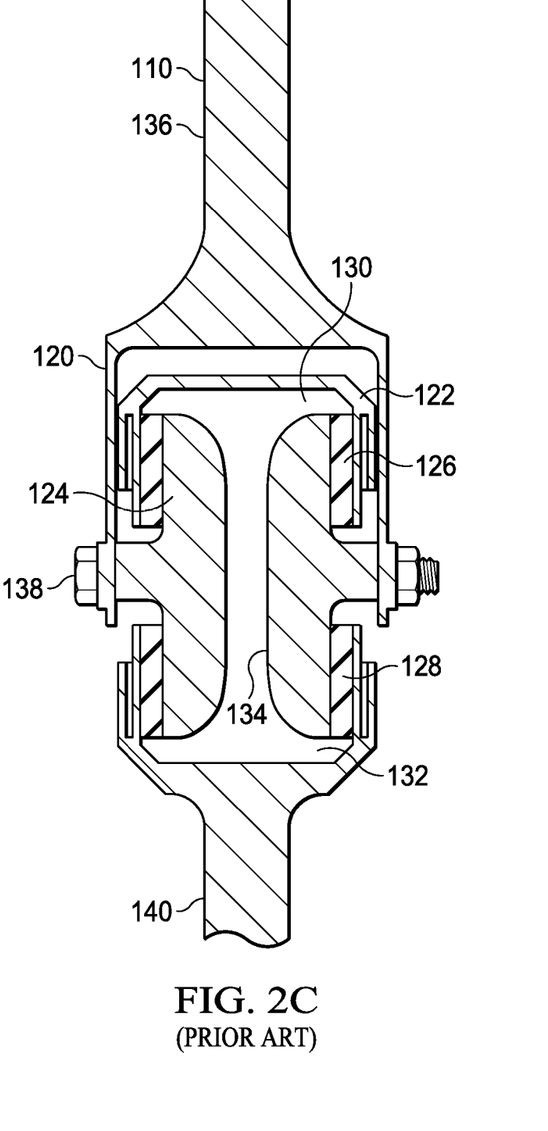

Referring to FIGS. 2A-2C in the drawings, a vibration isolation system used in previous aircraft is schematically illustrated and generally designated 100. Pylon assembly 102 includes transmission 104 and top case 106 supporting mast 108. Vibration isolation system 100 manages the vibration of pylon assembly 102 and includes pylon links 110. Ends 112 of pylon links 110 are bolted to top case 106 of pylon assembly 102. Ends 114 of pylon links 110 are bolted to airframe 116. Pylon links 110 are distributed around the outer circumference of pylon assembly 102 and have an angled configuration with one or more centrally located focal points 118. Each pylon link 110 includes a liquid inertia vibration eliminator unit 120. As best seen in FIG. 2C, which is a cross-sectional view of FIG. 2B taken along line 2C-2C, liquid inertia vibration eliminator unit 120 includes a housing 122 with a hollow, generally cylindrical interior. A piston 124 is disposed within the interior of housing 122. Journal bearings 126, 128 seal piston 124 within the interior of housing 122. Fluid chambers 130, 132 are defined by the interior of housing 122 and piston 124 and are sealed against leakage by journal bearings 126, 128. Tuning fluid is disposed within fluid chambers 130, 132. In addition to sealing the tuning fluid and fluid chambers 130, 132, journal bearings 126, 128 function as a spring to permit piston 124 to move or oscillate in a longitudinal direction relative to housing 122, while maintaining piston 124 in a central location in housing 122 when no load is applied. A tuning passage 134 extends centrally through piston 124 and permits the tuning fluid to flow between fluid chambers 130, 132. Because tuning passage 134 extends through piston 124, piston 124 is hollow and non-solid.

Top portion 136 of pylon link 110 attaches piston 124 to top case 106 of pylon assembly 102. Top portion 136 of pylon link 110 is attached to piston 124 via bracket 138. Bottom portion 140 of pylon link 110 attaches housing 122 to airframe 116. In operation, vibration of pylon assembly 102 at a particular frequency longitudinally displaces piston 124 relative to housing 122. Because the force and displacement are oscillatory over time, piston 124 similarly oscillates relative to housing 122. A displacement of piston 124 causes a displacement of tuning fluid through tuning passage 134 in the opposite direction of the displacement of piston 124. The displacement of piston 124 causes an oscillatory reaction force due to strain and journal bearings 126, 128. At the same time, the volumes of tuning fluid in fluid chambers 130, 132 are alternately increased and decreased such that the tuning fluid is pumped back and forth through tuning passage 134. The inertial force created by acceleration of the mass of the tuning fluid is out of phase with the pylon assembly vibration introduced to piston 124 via bracket 138. At an isolation frequency, the force of the mass of the tuning fluid cancels the force introduced to piston 124 via bracket 138, thereby isolating the vibration of pylon assembly 102.

Vibration isolation system 100 suffers from several drawbacks. For example, locating tuning passage 134 within piston 124 requires an increase in the overall size of liquid inertia vibration eliminator unit 120. Also, due to the limited number and placement of journal bearings 126, 128 within housing 122, journal bearings 126, 128 are forced to receive larger loads, which increases the size of journal bearings 126, 128 as well as liquid inertia vibration eliminator unit 120. Liquid inertia vibration eliminator unit 120 also lacks a spherical bearing that encapsulates piston 124, journal bearings 126, 128 and/or fluid chambers 130, 132, requiring liquid inertia vibration eliminator unit 120 to receive loads via bracket 138 at a location that increases the overall size of liquid inertia vibration eliminator unit 120. Indeed, these and other factors cause liquid inertia vibration eliminator unit 120 to have a high height to width ratio in which height 142 of liquid inertia vibration eliminator unit 120 exceeds width 144 of liquid inertia vibration eliminator unit 120 by a large margin. Referring back to FIG. 2A, the large size of liquid inertia vibration eliminator units 120 require liquid inertia vibration eliminator units 120 to be arranged around the circumference of pylon assembly 102 at an angular orientation that results in a base area having a large footprint 146. This large footprint 146 precludes vibration isolation system 100 from being used in aircraft with limited fuselage space such as compact helicopters or drones. Accordingly, a need has arisen for a compact liquid inertia vibration eliminator unit with a structural configuration that reduces the overall size of the unit to allow for deployment on aircraft with limited space.

Figure 3:
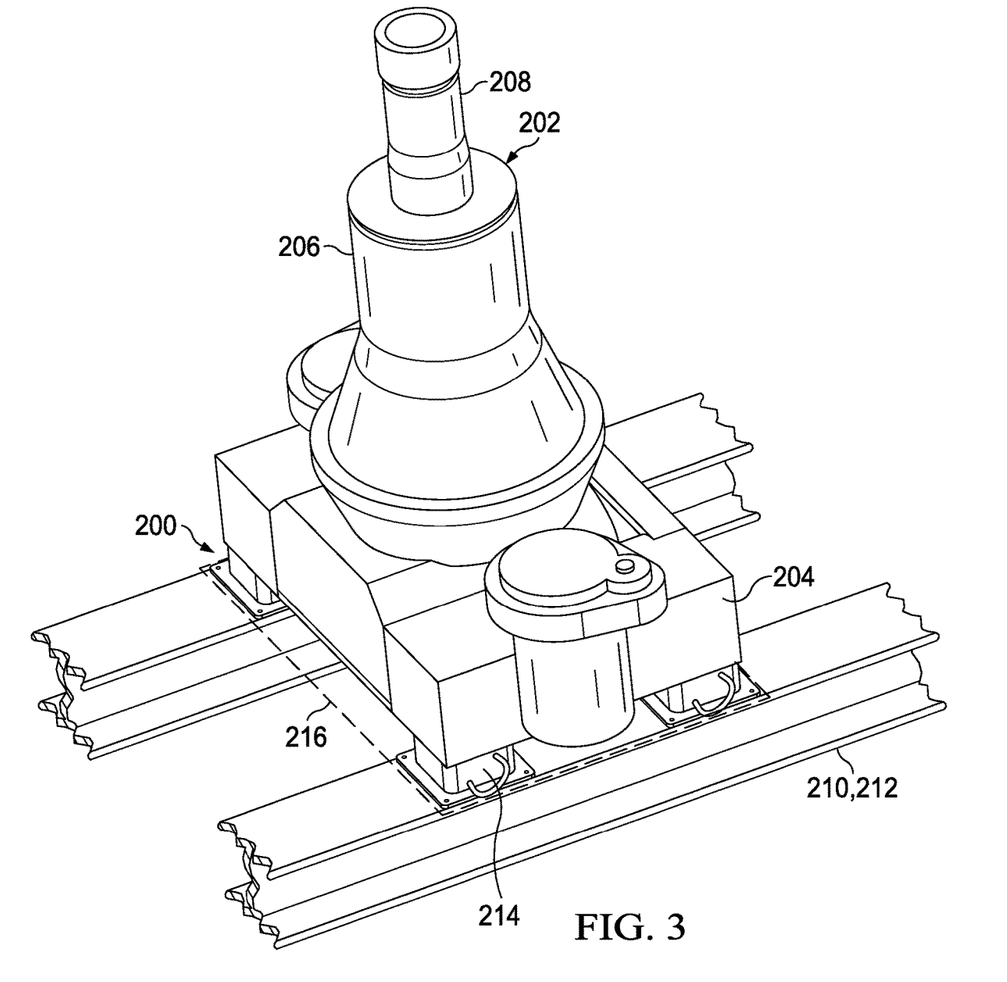
FIG. 3 is an isometric view of a compact vibration isolation system in accordance with embodiments of the present disclosure.

Referring to FIG. 3 in the drawings, a compact vibration isolation system for an aircraft is schematically illustrated and generally designated 200. Pylon assembly 202, which may be used for the main rotor system of a helicopter, includes transmission 204 and top case 206 supporting mast 208. The aircraft also includes fuselage airframe 210 including fore-aft beams 212. Fore-aft beams 212 may be overhead beams at or near the top side of a helicopter fuselage used to support the main rotor system of the helicopter. Compact vibration isolation system 200 includes compact liquid inertia vibration eliminator units 214. Compact liquid inertia vibration eliminator units 214 are smaller in size than liquid inertia vibration eliminator units 120 in FIGS. 2A-2C. In particular, compact liquid inertia vibration eliminator units 214 are flatter and have a lower height to width ratio. In one non-limiting example, compact liquid inertia vibration eliminator units 214 may have a height in a range between four and ten inches while height 142 of liquid inertia vibration eliminator unit 120 in FIGS. 2B-2C is 15 inches or more. Thus, compact liquid inertia vibration eliminator units 214 may be utilized in aircraft having space constrained designs and may fit into tighter spaces such as those typically present in small helicopters or other aircraft.

In the non-limiting example of FIG. 3, compact liquid inertia vibration eliminator units 214 are interposed between pylon assembly 202 and fore-aft beams 212 of fuselage airframe 210. More particularly, the top sides of compact liquid inertia vibration eliminator units 214 are coupled to the underside of pylon assembly 202 and the undersides of compact liquid inertia vibration eliminator units 214 are coupled to the top sides of fore-aft beams 212 of fuselage airframe 210. Although four compact liquid inertia vibration eliminator units 214 are shown to be interposed between pylon assembly 202 and fuselage airframe 210, any number of compact liquid inertia vibration eliminator units 214 may be utilized to isolate the vibration of pylon assembly 202. The smaller size of compact liquid inertia vibration eliminator units 214 allows compact liquid inertia vibration eliminator units 214 to be inserted beneath pylon assembly 202 as opposed to radiating from the pylon assembly as shown in FIG. 2A, resulting in a smaller footprint 216 for compact vibration isolation system 200.

Figure 4A:
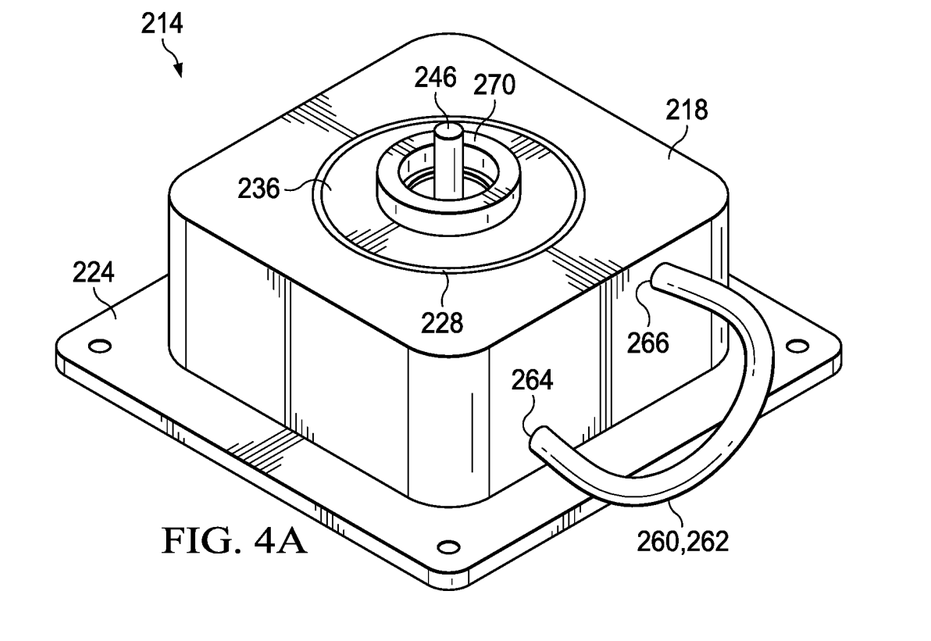
FIGS. 4A-4C are various views of a compact liquid inertia vibration eliminator unit in accordance with embodiments of the present disclosure.
Figure 4B:
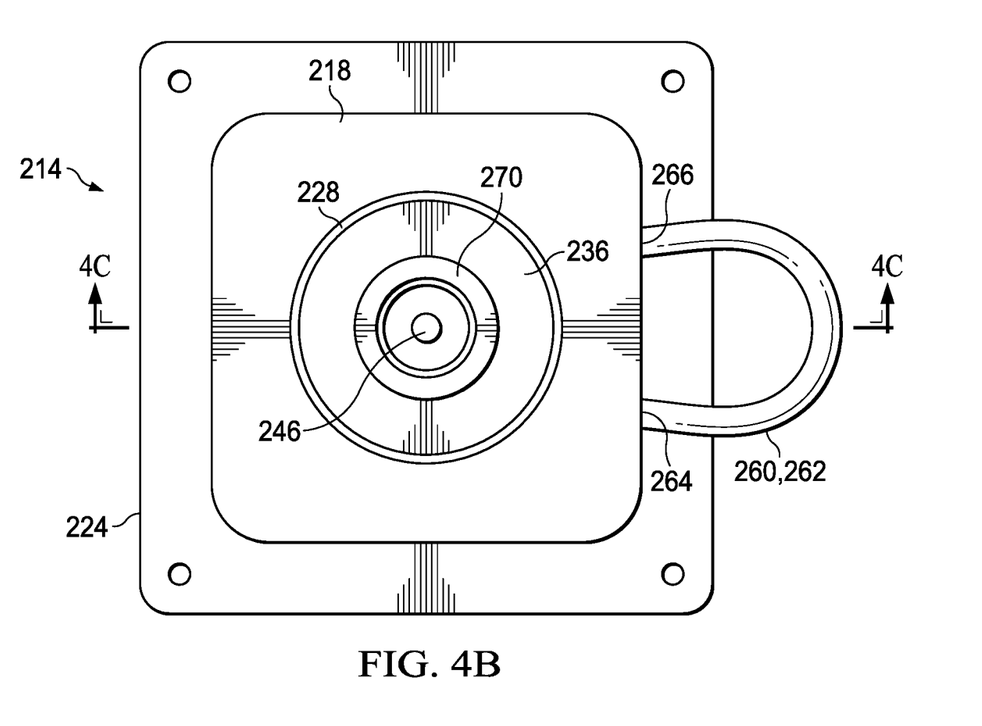
Figure 4C:
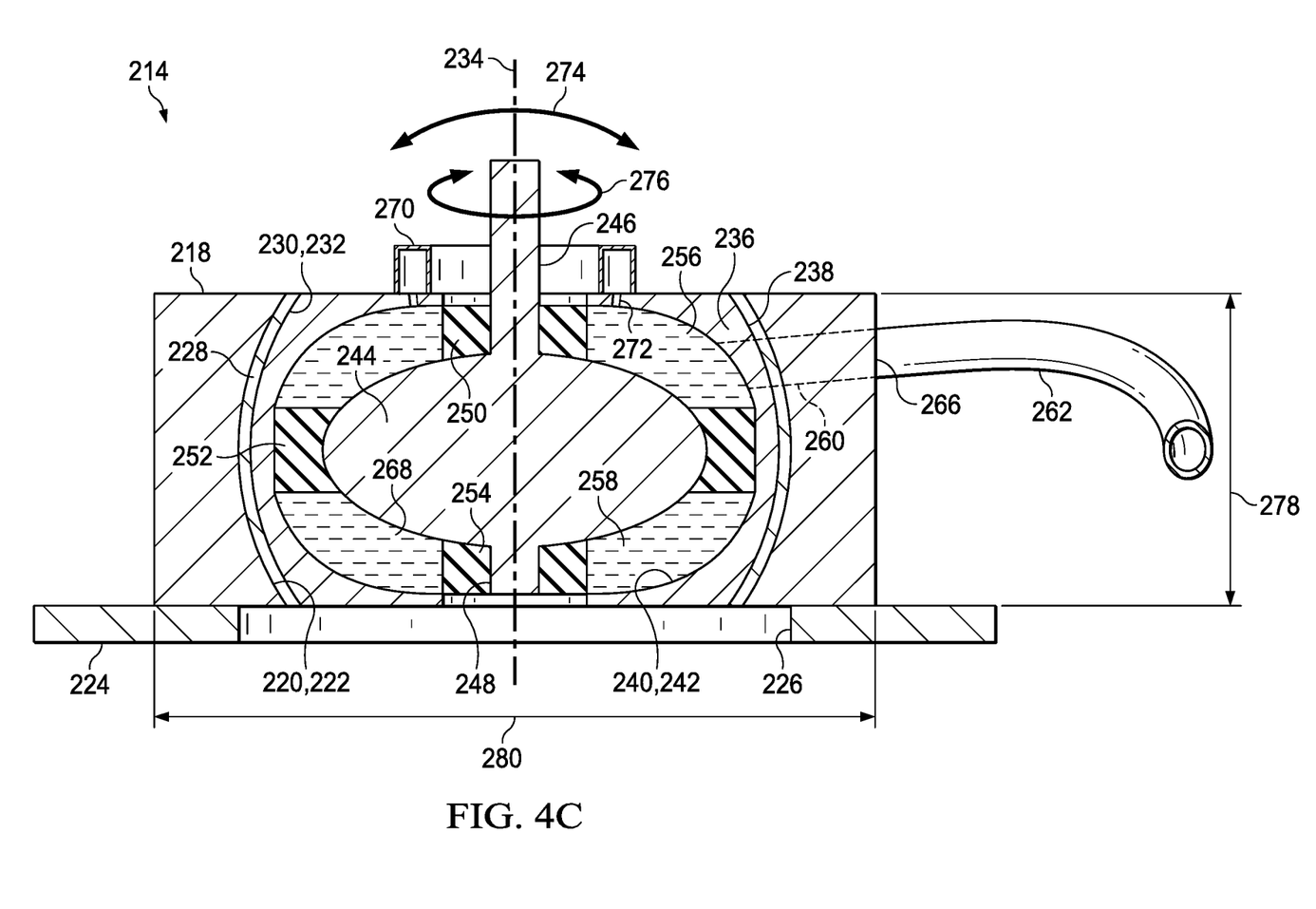

Referring to FIGS. 4A-4C in the drawings, compact liquid inertia vibration eliminator unit 214 of compact vibration isolation system 200 in FIG. 3 is schematically illustrated. Compact liquid inertia vibration eliminator unit 214 is encased by an outer housing 218. In the illustrated embodiment, outer housing 218 has a generally rectangular prism or cuboid shape, although in other embodiments outer housing 218 may form other shapes such as a cylinder. Outer housing 218 forms a concave inner surface 220 defining an outer housing cavity 222. In other embodiments, inner surface 220 may be flat, convex or irregular shaped. The underside of outer housing 218 is coupled to a mounting plate 224 forming a clearance aperture 226. A spherical bearing 228 is disposed in outer housing cavity 222. More particularly, spherical bearing 228, which may be formed from an elastomeric material such as rubber, substantially covers concave inner surface 220 of outer housing 218. In other embodiments, spherical bearing 228 may partially cover concave inner surface 220 of outer housing 218. Spherical bearing 228 forms a concave inner surface 230, which defines a spherical bearing cavity 232 formed by spherical bearing 228. In other embodiments, inner surface 230 of spherical bearing 228 may be flat, convex or irregular shaped. Spherical bearing 228 has a generally annular shape about a central axis 234 of compact liquid inertia vibration eliminator unit 214.

Disposed in spherical bearing cavity 232 is a fluid chamber housing 236. Spherical bearing 228 is interposed between fluid chamber housing 236 and outer housing 218. Fluid chamber housing 236 forms a convex outer side surface 238 shaped to contour concave inner surface 220 of outer housing cavity 222 and concave inner surface 230 of spherical bearing cavity 232. In other embodiments, outer side surface 238 of fluid chamber housing 236 may be flat, concave or irregular shaped. In the illustrated embodiment, spherical bearing 228 covers the entirety of convex outer side surface 238 of fluid chamber housing 236. In other embodiments, spherical bearing 228 may cover only a portion of convex outer side surface 238 of fluid chamber housing 236. Fluid chamber housing 236 forms a fluid chamber housing cavity 240 having a concave inner surface 242. A piston 244 is disposed in fluid chamber housing cavity 240 and spherical bearing cavity 232. Piston 244 is solid, or non-hollow, and forms an ellipsoid shape. In other embodiments, however, piston 244 may be semi-hollow and/or form other shapes. Top and bottom piston rods 246, 248 are coupled to the top and bottom sides of piston 244, respectively. Top and bottom piston rods 246, 248 may be integrally formed with piston 244.

Piston 244 is suspended within fluid chamber housing cavity 240 by journal bearings 250, 252, 254. Journal bearings 250, 252, 254 have an annular shape and may be formed from an elastomeric material such as rubber. Top journal bearing 250 is coupled to the top side of piston 244 and disposed about top piston rod 246. Bottom journal bearing 254 is coupled to the bottom side of piston 244 and disposed about bottom piston rod 248. Middle journal bearing 252 is coupled to the middle portion of piston 244 between the top and bottom sides of piston 244. In the illustrated embodiment, the middle portion of piston 244 is the portion of piston 244 furthest from central axis 234. Middle journal bearing 252 is interposed between the middle portion of piston 244 and fluid chamber housing 236. The spaces remaining between piston 244 and fluid chamber housing 236 are top and bottom fluid chambers 256, 258, which are disposed in fluid chamber housing cavity 240 and spherical bearing cavity 232 on opposite sides of piston 244. Fluid chambers 256, 258 are annular fluid chambers disposed about central axis 234. Top fluid chamber 256 is defined by the top side of piston 244, the top side of middle journal bearing 252, concave inner surface 242 of fluid chamber housing cavity 240 and the outer circumferential surface of top journal bearing 250. Bottom fluid chamber 258 is defined by the bottom side of piston 244, the bottom side of middle journal bearing 252, concave inner surface 242 of fluid chamber housing cavity 240 and the outer circumferential surface of bottom journal bearing 254.

A tuning passage 260 including an external tuning tube 262 disposed outside of outer housing 218 provides fluid communication between top and bottom fluid chambers 256, 258. In the illustrated embodiment, external tuning tube 262 is diagonally oriented on a side of outer housing 218 between ports 264, 266. In other embodiments, external tuning tube 262 could have other arrangements such as helical or coiled arrangements so long as ports 264, 266 are fluidically coupled thereby. Tuning passage 260 traverses through outer housing 218, spherical bearing 228 and fluid chamber housing 236 to fluidly connect top and bottom fluid chambers 256, 258 via external tuning tube 262. External tuning tube 262 may have a fixed or adjustable length. Tuning fluid 268, which may be a high density and/or low viscosity fluid, is contained within and movable between top and bottom fluid chambers 256, 258 via tuning passage 260. Journal bearings 250, 252, 254 seal tuning fluid 268 against leakage within top and bottom fluid chambers 256, 258. Middle journal bearing 252 sealingly separates top fluid chamber 256 from bottom fluid chamber 258 so that tuning fluid 268 passes through tuning passage 260 to move between top and bottom fluid chambers 256, 258.

A gas accumulator 270 protrudes from the top side of compact liquid inertia vibration eliminator unit 214. Gas accumulator 270 is disposed on the top side of fluid chamber housing 236. Gas accumulator 270 is in fluid communication with top and bottom fluid chambers 256, 258 via one or more gas passages 272. Gas accumulator 270 pressurizes tuning fluid 268 to offset the oscillatory pressure caused by shaking of tuning fluid 268 and to allow for thermal expansion of tuning fluid 268. The pressure provided by gas accumulator 270 also reduces or prevents cavitation air bubbles that may result from shaking of tuning fluid 268. In other embodiments, compact liquid inertia vibration eliminator unit 214 does not include a gas accumulator.

The materials from which the various components of compact liquid inertia vibration eliminator unit 214 may be formed are numerous. For example, outer housing 218, piston 244, fluid chamber housing 236 and/or mounting plate 224 may be formed from any composite or metallic material including aluminum, steel or metal alloys. External tuning tube 262 may be formed from a composite, metallic or elastomeric material. Journal bearings 250, 252, 254 and spherical bearing 228 may be formed from any elastomeric material such as rubber to permit movement between adjacent components. For example, the elasticity of journal bearings 250, 252, 254 permits piston 244 to oscillate along central axis 234. The elasticity of spherical bearing 228 permits fluid chamber housing 236, piston 244, journal bearings 250, 252, 254 and top and bottom fluid chambers 256, 258 to pivot or rotate relative to outer housing 218 as indicated by pivot and rotation arrows 274, 276. The various components of compact liquid inertia vibration eliminator unit 214 described herein may be manufactured using any additive, subtractive or formative manufacturing technique including, but not limited to, extrusion, machining, 3D printing, laser cutting, stamping, welding or casting as well as others.

Unlike liquid inertia vibration eliminator unit 120 in FIGS. 2A-2C, compact liquid inertia vibration eliminator unit 214 utilizes middle journal bearing 252 and partially encapsulates piston 244, journal bearings 250, 252, 254 and top and bottom fluid chambers 256, 258 within spherical bearing 228 to provide additional stability and allow for a more compact bearing configuration. Compact liquid inertia vibration eliminator unit 214 also utilizes external tuning tube 262 as part of tuning passage 260 instead of requiring the tuning passage to traverse piston 244 as shown for liquid inertia vibration eliminator unit 120 in FIGS. 2A-2C. These and other structural features allow compact liquid inertia vibration eliminator unit 214 to have a smaller height to width ratio than liquid inertia vibration eliminator unit 120 in FIGS. 2A-2C. In particular, height 278 of compact liquid inertia vibration eliminator unit 214 is less than width 280 of compact liquid inertia vibration eliminator unit 214, not including mounting plate 224. In some embodiments, width 280 may be two or more times greater than height 278 of compact liquid inertia vibration eliminator unit 214. The compact spatial dimensions of compact liquid inertia vibration eliminator unit 214 allows for its usage in tight areas such as beneath pylon assembly 202 as illustrated in FIG. 3.

Figure 5A:
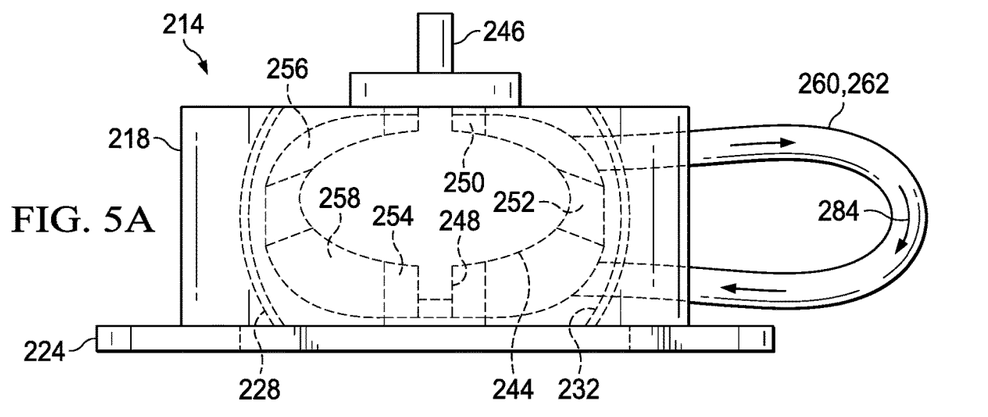
FIGS. 5A-5C are side views of a compact liquid inertia vibration eliminator unit in operation in accordance with embodiments of the present disclosure.
Figure 5B:
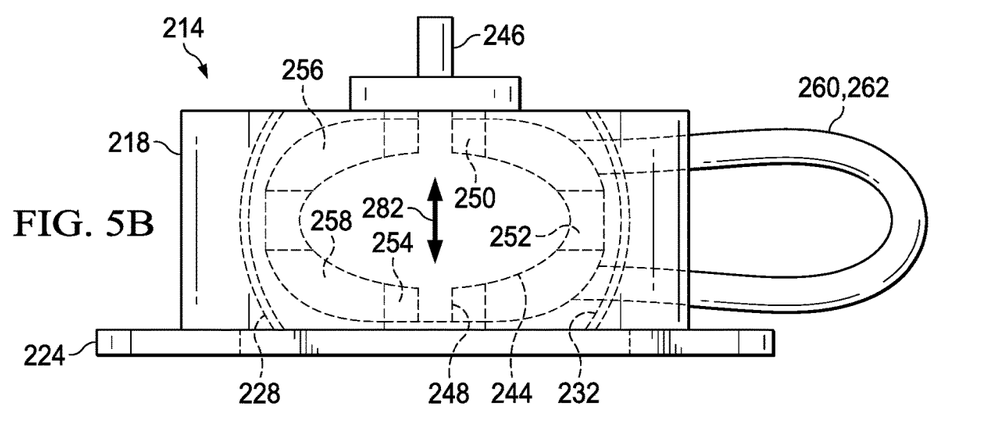
Figure 5C:
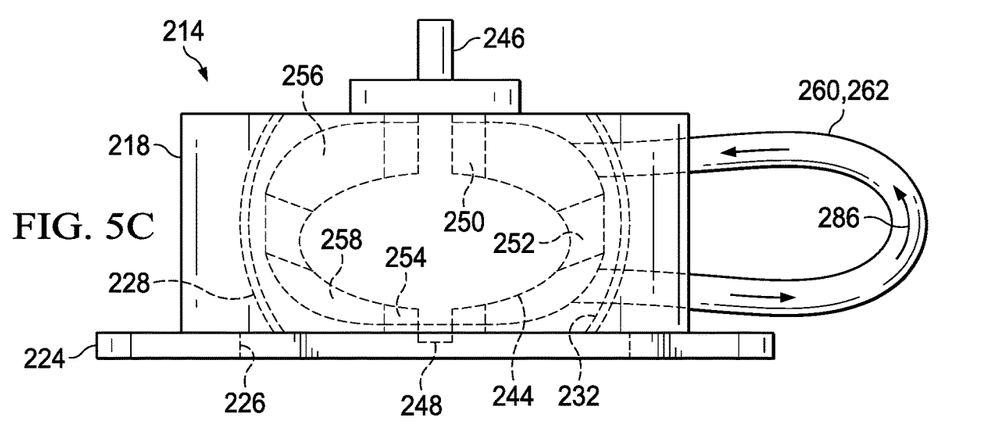

Referring to FIGS. 5A-5C in the drawings, the operation of compact liquid inertia vibration eliminator unit 214 is schematically illustrated. Compact liquid inertia vibration eliminator unit 214 isolates vibration between two or more components of an aircraft. In the illustrated embodiment, piston 244 is coupled to the underside of pylon assembly 202 in FIG. 3 via top piston rod 246. Outer housing 218 is coupled to the top side of fore-aft beams 212 of fuselage airframe 210 in FIG. 3 via mounting plate 224. Journal bearings 250, 252, 254 function as springs to permit piston 244 to move or oscillate upward and downward along double arrow 282 relative to outer housing 218, while maintaining piston 244 in a central location in outer housing 218 when no load is applied as shown in FIG. 5B. Vibration of pylon assembly 202 in FIG. 3 at a particular frequency causes piston 244 to oscillate inside spherical bearing cavity 232 relative to outer housing 218 along double arrow 282. The oscillation of piston 244 causes tuning fluid to oscillate between top and bottom fluid chambers 256, 258 via tuning passage 260 in the opposite direction of the displacement of piston 244. When piston 244 is displaced upward as shown in FIG. 5A, tuning fluid is displaced downward from top fluid chamber 256 to bottom fluid chamber 258 via tuning passage 260 as indicated by downward flow arrows 284. When piston 244 is displaced downward as shown in FIG. 5C, the tuning fluid is displaced upward from bottom fluid chamber 258 to top fluid chamber 256 via tuning passage 260 as indicated by upward flow arrows 286. The displacement of piston 244 causes an oscillatory reaction force due to strain and journal bearings 250, 252, 254. At the same time, the volumes of tuning fluid in top and bottom fluid chambers 256, 258 are alternately increased and decreased such that the tuning fluid is pumped back and forth through tuning passage 260. The inertial force created by acceleration of the mass of the tuning fluid is out of phase with the pylon assembly vibration introduced to piston 244 via top piston rod 246. At an isolation frequency, the force of the mass of the tuning fluid cancels the force introduced to piston 244 via top piston rod 246, thereby isolating the vibration of pylon assembly 202 in FIG. 3.

In the illustrated embodiment, compact liquid inertia vibration eliminator unit 214 is passive, and therefore does not require a power source to be operational. Passive compact liquid inertia vibration eliminator units may be more effective at or near a single vibration frequency. The isolation frequency at which compact liquid inertia vibration eliminator unit 214 is most effective can be varied by adjusting the length of external tuning tube 262. The isolation frequency of compact liquid inertia vibration eliminator unit 214 may also be adjusted in other ways such as by varying the K value, or spring rate, of journal bearings 250, 252, 254. The rate at which piston 244 oscillates can vary widely depending on the particular vibration isolation application and may range, for example, from about five times per second to about 100 times per second such as about 25 times per second. As best seen in FIG. 5C, clearance aperture 226 provides clearance for bottom piston rod 248 when piston 244 is downwardly displaced. The encapsulation of several components of compact liquid inertia vibration eliminator unit 214 by spherical bearing 228 provides additional stability to withstand the high forces present during operation.

Figures 6A, 6B:
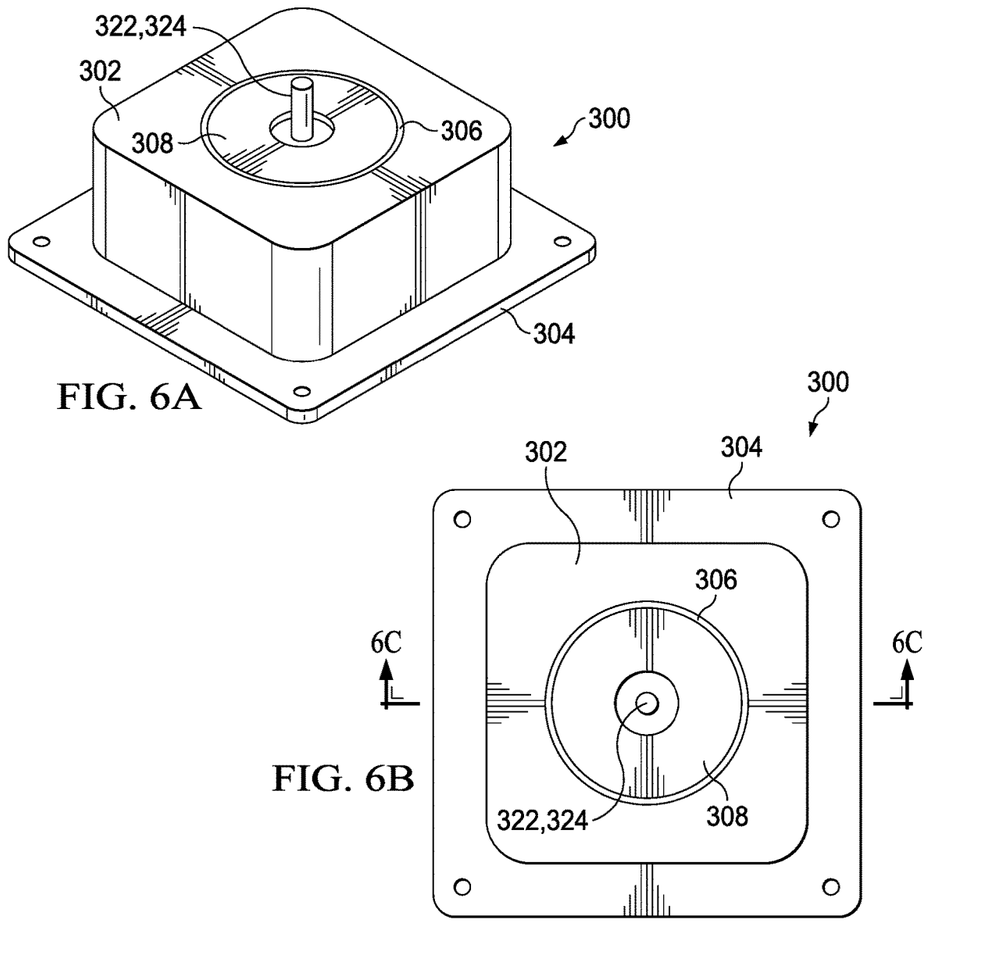
FIGS. 6A-6C are various views of a compact liquid inertia vibration eliminator unit in accordance with embodiments of the present disclosure.
Figure 6C:
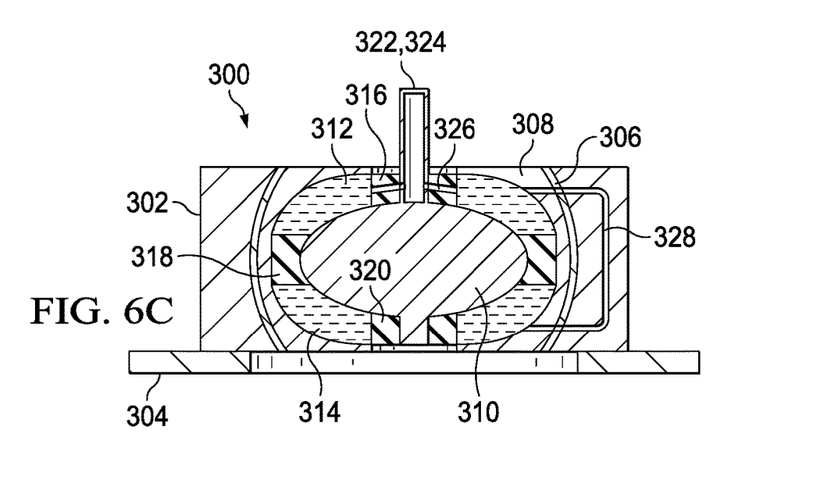

Referring to FIGS. 6A-6C in the drawings, a compact liquid inertia vibration eliminator unit is schematically illustrated and generally designated 300. Compact liquid inertia vibration eliminator unit includes outer housing 302, which is coupled to a first aircraft component such as an airframe via mounting plate 304. Spherical bearing 306 substantially encapsulates fluid chamber housing 308, piston 310, top and bottom fluid chambers 312, 314 and journal bearings 316, 318, 320. Compact liquid inertia vibration eliminator unit 300 includes gas accumulator 322, which is built into and disposed in top piston rod 324. Top piston rod 324 is also used to connect piston 310 to a second aircraft component such as a pylon assembly. Gas accumulator 322 is in fluid communication with top and bottom fluid chambers 312, 314 via gas passages 326 that traverse top journal bearing 316. Compact liquid inertia vibration eliminator unit 300 also includes tuning passage 328 formed within outer housing 302, spherical bearing 306 and fluid chamber housing 308. Compact liquid inertia vibration eliminator unit 300 thus lacks an external tuning tube, further reducing the dimensions of compact liquid inertia vibration eliminator unit 300.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A liquid inertia vibration eliminator unit for an aircraft having first and second components, the liquid inertia vibration eliminator unit comprising:
    an outer housing coupled to the first component of the aircraft, the outer housing forming an outer housing cavity;
    a spherical bearing disposed in the outer housing cavity and forming a spherical bearing cavity;
    a fluid chamber housing disposed in the spherical bearing cavity such that the spherical bearing is interposed between the fluid chamber housing and the outer housing;
    a piston disposed in the spherical bearing cavity and coupled to the second component of the aircraft;
    top and bottom fluid chambers disposed in the spherical bearing cavity on opposite sides of the piston and at least partially defined by the fluid chamber housing;
    a tuning passage providing fluid communication between the top and bottom fluid chambers; and
    a tuning fluid movable between the top and bottom fluid chambers via the tuning passage to at least partially isolate vibration between the first and second components of the aircraft.

2. The liquid inertia vibration eliminator unit as recited in claim 1 wherein the outer housing forms an inner surface defining the outer housing cavity, the spherical bearing substantially covering the inner surface of the outer housing and having a concave inner surface.

3. The liquid inertia vibration eliminator unit as recited in claim 1 wherein the piston oscillates inside the spherical bearing cavity in response to vibration of at least one of the first or second components of the aircraft.

4. The liquid inertia vibration eliminator unit as recited in claim 3 wherein the tuning fluid oscillates between the top and bottom fluid chambers via the tuning passage in response to the oscillations of the piston.

5. The liquid inertia vibration eliminator unit as recited in claim 1 wherein the piston further comprises a solid piston having an ellipsoid shape.

6. The liquid inertia vibration eliminator unit as recited in claim 1 further comprising a top piston rod coupled to a top side of the piston, the piston coupled to the second component of the aircraft via the top piston rod.

7. The liquid inertia vibration eliminator unit as recited in claim 1 wherein a top side of the piston at least partially defines the top fluid chamber and a bottom side of the piston at least partially defines the bottom fluid chamber.

8. The liquid inertia vibration eliminator unit as recited in claim 1 wherein the tuning passage further comprises an external tuning tube disposed outside of the outer housing.

9. The liquid inertia vibration eliminator unit as recited in claim 1 wherein the spherical bearing permits rotational and pivotal movement of the fluid chamber housing relative to the outer housing.

10. The liquid inertia vibration eliminator unit as recited in claim 1 further comprising a middle journal bearing interposed between a middle portion of the piston and the fluid chamber housing such that a top side of the middle journal bearing at least partially defines the top fluid chamber and a bottom side of the middle journal bearing at least partially defines the bottom fluid chamber.

11. The liquid inertia vibration eliminator unit as recited in claim 1 further comprising:
    a top journal bearing coupled to a top side of the piston;
    a bottom journal bearing coupled to a bottom side of the piston; and
    a middle journal bearing coupled to a middle portion of the piston between the top and bottom sides of the piston;
    wherein the journal bearings are annular and formed from an elastomeric material.

12. The liquid inertia vibration eliminator unit as recited in claim 1 further comprising a gas accumulator in fluid communication with the fluid chambers via a gas passage to pressurize the tuning fluid.

13. The liquid inertia vibration eliminator unit as recited in claim 12 further comprising a fluid chamber housing disposed in the spherical bearing cavity, the gas accumulator disposed on a top side of the fluid chamber housing.

14. The liquid inertia vibration eliminator unit as recited in claim 12 further comprising a top piston rod coupled to a top side of the piston, the gas accumulator disposed in the top piston rod.

15. A rotorcraft comprising:
    a fuselage;
    a fuselage airframe supporting the fuselage;
    a pylon assembly subject to vibration; and
    a plurality of liquid inertia vibration eliminator units interposed between the fuselage airframe and the pylon assembly, each liquid inertia vibration eliminator unit comprising:
    an outer housing coupled to the fuselage airframe, the outer housing forming an outer housing cavity;
    a spherical bearing disposed in the outer housing cavity and forming a spherical bearing cavity;

a fluid chamber housing disposed in the spherical bearing cavity such that the spherical bearing is interposed between the fluid chamber housing and the outer housing;

a piston disposed in the spherical bearing cavity and coupled to the pylon assembly;

top and bottom fluid chambers disposed in the spherical bearing cavity on opposite sides of the piston and at least partially defined by the fluid chamber housing;

a tuning passage providing fluid communication between the top and bottom fluid chambers; and a tuning fluid movable between the top and bottom fluid chambers via the tuning passage to at least partially isolate vibration between the pylon assembly and the fuselage airframe.

16. The rotorcraft as recited in claim 15 wherein the pistons of the liquid inertia vibration eliminator units are coupled to an underside of the pylon assembly and the outer housings of the liquid inertia vibration eliminator units are coupled to a top side of the fuselage airframe.

17. The rotorcraft as recited in claim 15 wherein each liquid inertia vibration eliminator unit has a height H and a width W and wherein W>H.

18. The rotorcraft as recited in claim 17 wherein W≥2H.

19. The rotorcraft as recited in claim 15 wherein each liquid inertia vibration eliminator unit further comprises a mounting plate forming a clearance aperture coupled to an underside of the outer housing, the outer housing coupled to the fuselage airframe via the mounting plate.

* * * * *